(12) United States Patent
Baldus

(10) Patent No.: US 7,537,794 B2
(45) Date of Patent: May 26, 2009

(54) ANIMAL CHEW

(76) Inventor: David Baldus, 11806 W. Potter Rd., Wauwatosa, WI (US) 53226

( * ) Notice: Subject to any disclaimer, the term of this patent is extended or adjusted under 35 U.S.C. 154(b) by 554 days.

(21) Appl. No.: 11/134,559

(22) Filed: May 20, 2005

(65) Prior Publication Data

US 2005/0260306 A1 Nov. 24, 2005

Related U.S. Application Data

(60) Provisional application No. 60/573,130, filed on May 21, 2004.

(51) Int. Cl.
*A23K 1/14* (2006.01)
*A23K 1/18* (2006.01)

(52) U.S. Cl. ................. 426/635; 426/637; 426/302; 426/805

(58) Field of Classification Search ............... 426/637, 426/302, 805, 635
See application file for complete search history.

(56) References Cited

U.S. PATENT DOCUMENTS

| | | | |
|---|---|---|---|
| 2,769,714 A * | 11/1956 | Stahmer | 426/144 |
| 3,794,500 A * | 2/1974 | Lazar et al. | 426/511 |
| 4,632,834 A | 12/1986 | Barnes et al. | |
| 4,892,748 A | 1/1990 | Andersen et al. | |
| 5,118,518 A | 6/1992 | Hattori et al. | |
| 5,431,927 A | 7/1995 | Hand et al. | |
| 5,500,239 A | 3/1996 | Hayward | |
| 5,501,868 A | 3/1996 | Collings et al. | |
| 6,060,100 A | 5/2000 | Koller | |
| 6,126,978 A * | 10/2000 | Axelrod | 426/285 |
| 6,228,418 B1 * | 5/2001 | Gluck et al. | 426/623 |
| 6,468,573 B1 * | 10/2002 | Herrick et al. | 426/445 |
| 6,601,539 B1 | 8/2003 | Snook | |

FOREIGN PATENT DOCUMENTS

FR 2769472 A1 * 4/1999
JP 2002142707 A * 5/2002

OTHER PUBLICATIONS

Database FSTA [Online] International Food Information Service (IFIS), Frankfurt-Main, DE; 1986; Baba, T., et al., "Development of snack foods produced from sweet potatoes. III. Effects of blanching-freezing treatment on the texture of imo-karinto." XP002342022, Database accession No. 86-2-05-g0010.
Database EPODOC, European Patent Office, The Hauge, NL, Ohara Yoshio; Doi Shuji, "Production of Dried Food" XP002342027, Feb. 1986.
Anonymous: Internet Citation, [Online] XP002342024, Retrieved from the Internet: URL:http://www.puplife.com/dogsupplies/samsyams.html> [retrieved on Aug. 24, 2005].

* cited by examiner

*Primary Examiner*—C. Sayala
(74) *Attorney, Agent, or Firm*—Charles S. Sara, Esq.; Dewitt Ross & Stevens, S.C.

(57) ABSTRACT

A nutritious, flavorful, digestible animal chew made from a dehydrated sweet potato is provided. The animal chew is non-allergenic and has a striated, deeply furrowed surface to improve the oral hygiene of an animal. The animal chew is low in calories, high in vitamins, minerals, and fiber and contains no animal-based or synthetic products.

4 Claims, No Drawings

ANIMAL CHEW

CROSS REFERENCE TO RELATED APPLICATION

This application claims priority under 35 USC §119(e) to U.S. Provisional Application Ser. No. 60/573,130, filed 21 May 2004, the entirety of which is hereby incorporated herein by reference.

FIELD OF THE INVENTION

The invention relates generally to an animal chew product and specifically to a dog chew comprising a highly nutritious, digestible, dehydrated sweet potato.

BACKGROUND OF THE INVENTION

Animals, especially dogs, enjoy chewing hard objects. As animals receive a number of benefits from chewing hard objects, a multitude of digestible animal chew products exists. However, many ingredients used in conventional animal chews cause allergic reactions. For instance, most conventional animal chews contain such ingredients as wheat, gluten, corn, soy, milk, whey, casein, beef, pork, chicken or artificial flavors and colors. Recent studies show that approximately 20-50% of dogs are allergic to such ingredients. Further, some conventional animal chews can also contain animal products such as rawhide, bull penises (bully sticks), pig ears or pig snouts which can cause serious infections and stain animal owners' carpeting and furniture. Other conventional animal chews use synthetic materials such as ethylene copolymers, nylon and rubber. However, these materials can be swallowed whole or in part by animals, causing discomfort and/or injury to the animals' digestive tract. Conventional animal chews often contain highly refined starches, fats and animal digests, resulting in high calorie, low fiber products. Conventional animal chews are typically manufactured using high temperature injection molding, compression molding and/or baking. However, high temperatures destroy most nutrients and compression frequently requires palatability enhancers.

Therefore, a need exists for a nutritious, digestible animal product made without animal by-products, highly processed ingredients or synthetic materials.

SUMMARY OF THE INVENTION

The present invention is directed to an animal chew comprising a sliced sweet potato having a moisture content of between about 7 and 35%. The present invention is more specifically directed to an animal chew comprising a dehydrated sweet potato having a thickness between about 0.5 and 1.5 inches; a moisture content between about 11 and 20%; a hard, furrowed surface; and added nutrients and flavorants to increase the nutrition, taste and effectiveness of the animal chew.

The present invention is further directed to a process for making an animal chew comprising trimming at least two sides of the sweet potato to allow for adequate steam penetration and uniform dehydration; cutting the sweet potato to a desired thickness and shape; blanching the cut sweet potato for a time sufficient to remove all debris and cease enzymatic activity; and drying the cut sweet potato to a moisture content of not greater than 20%.

The present invention is more specifically directed to a process for making an animal chew comprising washing a sweet potato to remove all dirt and debris; heating the washed sweet potato at a temperature of about 60 to 90° F. (16 to 32° C.) for a time sufficient to reduce breakage of the sweet potato; trimming the sweet potato on at least two sides to a length sufficient to allow even blanching and dehydration; slicing the trimmed sweet potato into segments of desired shape and thickness with a furrowed surface; heating the segmented sweet potato to a temperature between about 200 and 220° F. (93 and 104° C.) for a time sufficient to eliminate any debris; steaming the segmented sweet potato at a temperature and time sufficient to stop all enzymatic activity; dehydrating the steamed sweet potato to a moisture content of between 11 and 20%; storing the dehydrated sweet potato in a moisture-controlled environment for up to three weeks; and treating the dehydrated sweet potato with additional nutrients or flavorants.

The product of the present invention comprises a nutritious, flavorful, digestible animal chew product made from a dehydrated sweet potato having not less than about 11% moisture. The animal chew is non-allergenic and has a striated, deeply furrowed surface to improve the oral hygiene (teeth, gums and oral cavity) of an animal. The animal chew is low in calories, high in vitamins, minerals, anti-oxidants and fiber, and contains no animal or synthetic products. Because the animal chew does not contain any animal products or synthetic products using colorants, the animal chew will not stain carpets or furniture. Further, the animal chew produces no foul odors and can provide up to 38% of the recommended vegetables and fruits in an animal's diet.

The preferred furrowed, striated surface of the animal chew also provides a beneficial oral hygiene device. The furrowed surface provides a superior mechanical cleaning of the animals' teeth and gums, while the highly flavorful sweet potato improves the animals' breath. Further, the animal chew contains relatively high moisture levels compared to conventional animal chews (see Table 1), making the animal chew digestible and preventing it from lodging in the throat or intestine of the animal.

TABLE 1

| Animal Chew Composition | |
|---|---|
| Crude Protein | Not less than 5% |
| Crude Fat | Not less than 0% |
| Crude Fiber | Not more than 2% |
| Moisture | Not more than 35% |

A summary list of the advantages of the animal chew of the present invention follows:

1. Furrowed striated surface providing superior mechanical cleaning of the teeth;
2. Reduction in fears of rawhide intestinal impaction or throat lodging;
3. Highly flavorful (palatable) to dogs;
4. High fiber content, which dramatically improves digestive health;
5. High nutrient content, especially necessary to animals and particularly to dogs, such as vitamin A, $B_6$, calcium, potassium, phosphorus, iron, thiamin, riboflavin, niacin;
6. Will not stain carpets, a common complaint made against rawhides, pig ears, flavor enhanced rawhide or color-added chews.
7. Produces no foul odors;
8. Helps meet canine dietary requirement for up to 38% vegetables and fruits in their diet;
9. Low in calories—high in anti-oxidants;

10. No highly processed materials, such as wheat gluten, corn starch, casein, plastics or polymers. Just pure food—sweet potato; and
11. Effective as a dental chew.

The animal chew of the present invention is particularly well-suited for use by dogs, but other animals such as cats, rabbits, guinea pigs and birds will also benefit from a nutritious, digestible animal chew.

The scope of the invention will appear more fully from the following detailed description of the preferred embodiment of the invention.

DETAILED DESCRIPTION OF THE INVENTION

The animal chew of the present invention comprises a dehydrated sweet potato having a furrowed surface made using a two-step blanching and dehydrating process. Sweet potatoes having orange flesh, such as the Beauregard, Jewels, Garnet, Morning Glory or Redskin varieties, are preferred, with sweet potatoes of the Morning Glory family, Ipomoea batatas genus, being the most preferred. However, all varieties of sweet potato may be used in the present invention.

The animal chew of the present invention is highly nutritious. Using sweet potatoes capitalizes on the high levels of nutrients, anti-oxidants and fiber inherent to the sweet potato. Sweet potatoes are an excellent source of vitamin A, potassium, vitamin C, vitamin B6, riboflavin, copper, pantothenic acid, folic acid, calcium and phosphorus. The animal chew of the present invention is also low in calories and high in fiber.

The animal chew product of the present invention is manufactured by segmenting, blanching and dehydrating a sweet potato. The sweet potatoes can be of any variety, although orange-fleshed sweet potatoes of the Morning Glory variety are preferred. The sweet potatoes can be of any size, although extra large sweet potatoes are preferred, as a single potato can create several animal chews.

After washing the potatoes to remove all dirt and debris, the sweet potatoes are heated to between 60 and 90° F. (16 to 32° C.), preferably 70 and 80° F. (21 and 27° C.), for a time sufficient to reduce breakage of the sweet potato during cutting. After washing and heating, the sweet potatoes are trimmed on at least two sides and cut into individual segments. The sweet potato must be trimmed to allow adequate steam penetration during the blanching process and to provide a uniform, even dehydration process.

Each sweet potato is preferably segmented into thin, wide slabs or can be segmented into a long, narrow "French fry" shape. Sweet potatoes having a square, box-like shape between 4 and 7 inches long are best cut into long, narrow "French fries," while conventional, oval-shaped sweet potatoes of all lengths are best cut into wide slabs of various thicknesses. For "French fry" segments, the sweet potato peel should be trimmed on all four sides of the sweet potato. For slab-cut segments, two opposing sides of the sweet potato peel should be trimmed.

The sweet potatoes can be cut or sliced using a hand-held crinkle cut blade or a mechanical slicer, such as a Model DiversaCut 2110 by Urschell, or a 20" Vegetable Slicer by Commercial Slicers. Both the hand-held and mechanical slicers cut a series of deep furrows in the sweet potato segment. Deeper furrows cause more exaggerated ripples in the finished product, providing a more abrasive dental chew to the animal. The deep furrows also provide at least 25-35% more surface area as compared to a sweet potato segment with a flat cut surface, increase heat penetration of the sweet potato segments during both the blanching and the dehydration steps and prevent the segments from sticking during dehydration.

Regardless of the size or shape, the segments are preferably cut along the length of the sweet potato so as to keep the skin of the sweet potato intact. Keeping the skin intact contains the many nutrients and minerals safely within the sweet potato, providing a highly nutritious animal chew.

The segments preferably range in thickness from about 0.25 to 2.0 inches, with a preferred thickness of between about 0.5 and 1.5 inches, with a most preferred thickness of about 1.0 inch. The segments can be anywhere from about 2 to 12 inches long, depending on the size of the sweet potato. In a preferred version, the sweet potato segments are between about 3 and 8 inches long, with a most preferred length of between about 5 and 7 inches. The thickness can be manipulated depending on the size and needs of the animal. For instance, senior dogs may require a softer chew. The thicker segments may require perforation by knife, bristle or paddles to achieve the desired moisture contents.

Once the sweet potatoes are washed, heated and segmented, the segments are blanched using a two-step process. Blanching stops all enzymatic activity in the sweet potato while eliminating bacteria, molds and fungi. Blanching also ensures a more uniform and quicker dehydration and helps maintain a brighter, more attractive, orange color. In step one of the blanching process, the sweet potato segments are exposed to water heated to between 200 and 220° F. (93 and 104° C.), preferably between 206 and 211° F. (97 and 99° C.). This temperature eliminates any sand or soil particles remaining on the surface of the sweet potato segment and begins the heat process required to stop enzymatic activity in the sweet potato segments.

In step two, the sweet potato segments are steam treated to stop all enzymatic activity in the sweet potato. The temperature of the steam and length of exposure may vary, depending on the size and thickness of the sweet potato segments. For instance, a "French fry" segment approximately 0.5 inches thick and 5 inches long will require an estimated 1 to 8 minutes of steam. A small to medium slab-cut segment approximately 1 inch thick and 5 inches long will require an estimated 1 to 10 minutes of steam. A medium to large slab-cut segment approximately 1.5 inches thick and 5-12 inches long will require an estimated 1 to 12 minutes of steam. If the segments have a flat surface instead of the preferred furrowed surface, the blanching process will take approximately one to two minutes longer for each size.

After blanching, the sweet potato segments may optionally be cut into various shapes such as a pig's ear, a bone, etc. A hand-held cutout may be used, as well as an automated die-cut machine.

After the segment is in the desired shape, the blanched sweet potato segments are dehydrated to a moisture level between 11 and 20%. The segments may be dehydrated using an electric dehydrator or one that uses hydrocarbon fuel. Both types of dehydration are well known to the art in the food industry. The length of time required for dehydration depends on the size and thickness of the segments, as well as the type of apparatus used. For instance, small to medium segments require an estimated 11 to 40 hours of dehydration, while medium to large segments require up to 15 to 48 hours. The sweet potato segments are preferably dehydrated until hard and appear dry, yet with a slight flexibility. The dehydrating apparatus should be housed in an area that provides adequate ventilation so that the moisture generated during the dehydration is vented off.

After the desired moisture content has been achieved, the dehydrated sweet potato segments are stored in moisture-controlled bins, known to the art, for 1 to 3 weeks to equalize the moisture content of the chews. This is a critical step in creating a chew with consistent hardness and texture.

After the required storage time, the resultant animal chew may be treated with additional nutrients and/or flavorants. For instance, nutrients such as vitamin A, vitamin C, vitamin E, zinc, nettles, mullein, alfalfa, chlorophyll, Echinacea, methyl-sulfonyl-methane, glucosamine, chondroitin, shark cartilage powder and green lipped mussel powder will help to increase the shelf life of the animal chew, maintain the distinctive sweet potato color and provide additional nutrients to the animal.

Likewise, flavorants such as beef broth, poultry broth, vegetable broth, peanut-butter broth, peppermint, mint, spearmint, chamomile, garlic, parsley, tarragon, fennel, ginger and green tea will help to enhance the flavor and palatability of the chew and help control malodorous breath in animals. The nutrients and flavorants are preferably applied to the animal chew using an oil mist or dry baste of the substance on the surface of the animal chew.

The animal chews may be stored at room temperature in moisture-controlled packages for at least one year from the date of dehydration. Preferred packages are airtight poly or cellophane bags, with appropriate shelf life stamps provided.

In an alternate version, the animal chew of the present invention is manufactured as discussed above, with an additional rehydration step. In this version, after the sweet potato segments have been blanched and cut into the desired shape, they are dehydrated to a moisture content between 18 and 28%. The time required to reach these moisture levels depends on the size and thickness of the segments. For instance, small to medium segments require an estimated 8 to 36 hours of dehydration, while medium to large segments require 10 to 42 hours. Once the segments have been dried to the desired moisture levels, they are rehydrated with a flavored broth to a moisture level of between 30 and 40%. The rehydration can be accomplished using a spray-on application for a continuous conveyor or by immersion in the broth for a specific time. After the segments have been immersed in the broth, the segments can be spun- or drip-dried. The rehydration acts to trap the flavor and nutrients of the broth in the sweet potato segment.

The rehydrated sweet potato segment is then dehydrated again to a moisture content of between 11 and 20%. Depending on the size and thickness of the segment, this can take an additional 1 to 12 hours of dehydration. The broth preferably contains beef, poultry or peanut butter, although other additives such as peppermint, alfalfa, chamomile and parsley may be used. This version provides additional flavor and nutrients to the animal chew while remaining vegetarian and digestible.

Various makes and models of all the equipment discussed above are available and a manufacturer familiar with the art will be able to select appropriate equipment to meet production and facility requirements.

It is understood that the invention is not confined to the particular construction and arrangement of parts herein illustrated and described, but embraces such modified forms thereof as come within the scope of the following claims.

What is claimed is:

1. A process for making an animal chew comprising the following order or steps:
   a) washing a sweet potato to remove all dirt and debris; then
   b) heating the washed sweet potato at a temperature of about 60 to 90° F. (16 to 32° C.) for a time sufficient to reduce breakage of the sweet potato; then
   c) slicing the washed sweet potato into segments of desired shape and thickness with a furrowed surface; then
   d) exposing the segmented sweet potato to water heated to a temperature between about 200 and 220° F. (93 and 104° C.) for a time sufficient to eliminate any debris; then
   e) steaming the segmented sweet potato at a temperature and time sufficient to stop all enzymatic activity; then
   f) dehydrating the steamed sweet potato to a moisture content of between about 11 and 20%; then
   g) storing the dehydrated sweet potato in a moisture-controlled environment for up to three weeks; and then
   h) treating the dehydrated sweet potato of step (g) with additional nutrients or flavorants.

2. The process of claim 1, wherein the segmented sweet potatoes have a thickness between about 0.25 and 2.0 inches.

3. The process of claim 1, further comprising the following step:
   i) trimming the sweet potato on at least two sides to a length sufficient to allow even blanching and dehydration.

4. The process of claim 1 further comprising:
   slicing the sweet potato into shapes including a rounded block, bone, pig's ear, pig snout, bone or lamb chop.

* * * * *